(No Model.)

O. MALLORY.
TRACE BUCKLE.

No. 496,319. Patented Apr. 25, 1893.

Witnesses,

Inventor,
Ogden Mallory,
By Dewey & Co.
Attys

UNITED STATES PATENT OFFICE.

OGDEN MALLORY, OF AUBURN, CALIFORNIA.

TRACE-BUCKLE.

SPECIFICATION forming part of Letters Patent No. 496,319, dated April 25, 1893.

Application filed May 31, 1892. Serial No. 435,065. (No model.)

*To all whom it may concern:*

Be it known that I, OGDEN MALLORY, a citizen of the United States, residing at Auburn, Placer county, State of California, have invented an Improvement in Trace-Buckles; and I hereby declare the following to be a full, clear, and exact description of the same.

My invention relates to certain improvements in trace buckles, and it consists in certain details of construction which will be more fully explained by reference to the accompanying drawings, in which—

Figure 1:
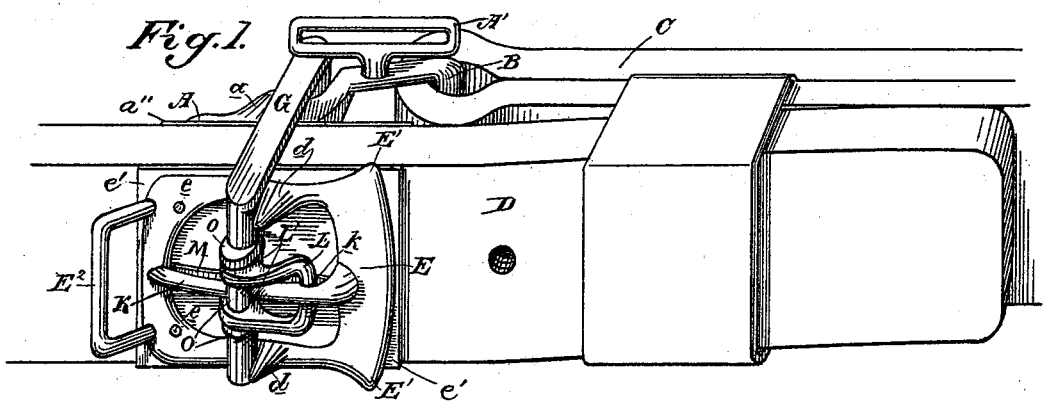
Figure 2:
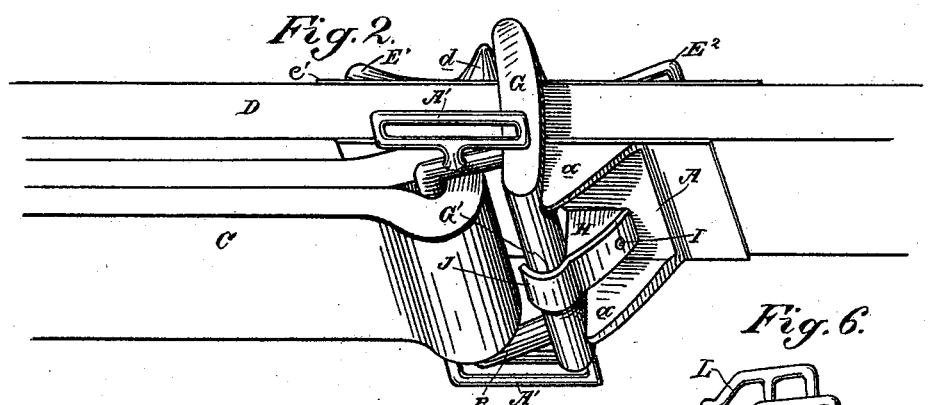
Figure 3:
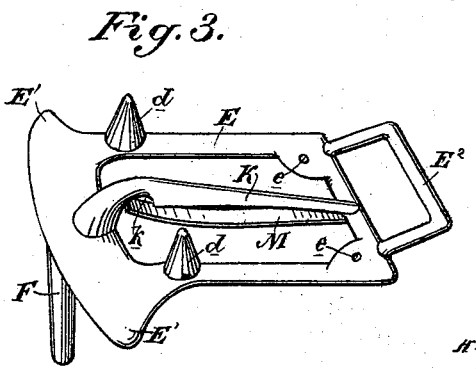
Figure 5:
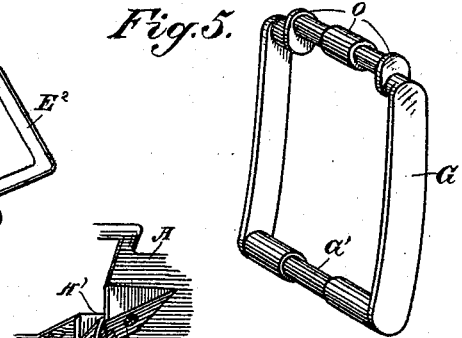
Figure 6:
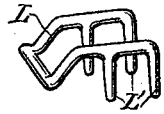
Figure 4:
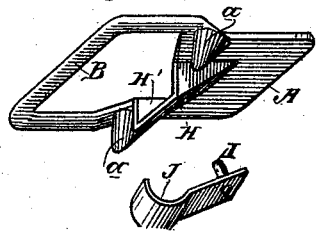
Figure 7:
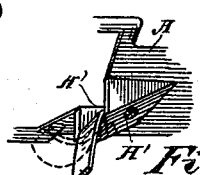

Figure 1 is a view of the outer part of my buckle. Fig. 2 is a view of the inner part. Fig. 3 is a view of the outer clamping plate. Fig. 4 is a view of the inner clamping plate, the hook being detached. Fig. 5 is a detail of the gripping bail. Fig. 6 is a detail of the connecting link. Fig. 7 shows a modification of the clasping hook.

The object of my invention is to provide certain improvements in the construction of buckles, links, wear-plates and connecting parts which are used to unite the traces used in light or heavy harness to the main portion of the harness.

A is the inner clamping plate having cast with it the yoke B which is secured to that part of the harness C through which the draft is applied.

D is the trace and E is the outer clamping plate which also carries the tongue F. The tongue F is adapted to pass through a hole in the trace when the outer plate is in its proper position, lying upon the outside of the trace. The two clamping plates are then united together by means of a gripping bail G which extends around the outside of both plates as shown. The inner plate has an inclined surface formed upon it at H, and this inclined surface has a hole made through it into which the rivet I is introduced. The head of this rivet has an extension J curved into the form of a hook which clasps the center of the gripping bail at G' where it crosses outside of the inner plate A. Any other suitable device may be substituted at this point to form a fulcrum or pivot point for the gripping bail. The outer sides of this plate A are raised and have projecting points, as shown at $a$ to keep the bail in place and to hold the bail at a considerable distance away from the surface of the trace, and thus allow the use of a longer link than would be needed if the plate were made as flat and thin as possible. This greater length of the side bars of the bail gives it an increased leverage and clamping capacity, but on light harness, the plate may be made flat if desired. The points $a$ upon the inner plate serve as stops or shoulders against which the fulcrum or pivot bar of the gripping bail is held and kept in place.

Beneath the clamping plate A may be placed a wear piece of leather, $a$ if desired, so that the movement of the trace over the plate will not injure it.

The outer plate E has a longitudinal central bar K which is formed with a notch or depression $k$ on the inner side, and near to the front end, and to the tongue F which projects from this front end. It also has angular projections at E' to allow a hold for the purpose of disengaging the tongue if it becomes stuck or fast in place.

L is a small connecting link so formed as to extend beneath the central bar K, and engage with the groove or depression $k$ on the under side. The sides of this link L extend backward, and have projecting hooks or lugs L' which clasp the outer cross-bar of the main link G. Any other suitable form of attachment may be used at this point to connect the parts together.

M is a spring, which may be of any suitable form, riveted to the inside of the tongue plate and pressing against the connecting link L so as to retain it normally in the groove $k$ in the central bar. This serves to retain the main link in proper relation with the outer tongue and clamping plate and prevents the tongue from being forced out of place if the trace should be pushed forward. This small connecting link also serves to hold the tongue-plate in place when it is thrown back to withdraw the tongue, and allow the trace to be moved. This is easily effected at any time by pressing upon the link L, thus causing the spring beneath it to yield and allow it to slip out of the groove in the central bar, and the link may then slide upon the bar to the rear end of the plate. At this point it forms a fulcrum about which the tongue-plate may be turned to lift the tongue out of the hole in the trace. That part of the grip bail which passes outside of the outer plate is slightly arched to clear the bar K, and has shoulders O formed upon it to keep the link L in place. The rear portion of this plate E is cast with enlarged flat surfaces as shown at e, and holes are cast in these surfaces by which a wear-piece e' may be riveted or otherwise secured beneath this pressure plate, thus keeping it in place and protecting the outer surface of the trace from chafing. The inner surface of the inside clamping plate A is formed with a depression H' upon the opposite side to the inclined surface previously described, through which the rivet I passes, and this depression leaves a space which prevents the plate from striking against the point of the tongue where it projects through the trace in case the latter be drawn back near this plate.

The main link G has its sides slightly curved at the inner end, as shown, so as to allow it to be brought as near as possible to the hame tug to which the device is attached.

In Fig. 1. I have shown the inner clamping plate having the slotted extensions A' upon each side for the attachment of the back strap and the belly-band as is done in heavy harness, and the outer plate having the rearward extension and yoke $E^2$ through which the side strap passes, but in the other figures it will be seen that by my peculiar construction I am enabled to dispense with these sides A', and also with the yoke $E^2$, thus leaving the device very compact and simple.

Having thus described my invention, what I claim as new, and desire to secure by Letters Patent, is—

1. In a trace buckle, the inner and outer clamping plates and connecting grip bail, said outer plate having formed with it the longitudinal centrally disposed bar K provided on its inner side with a groove or depression, and a link journaled upon the cross bar of the bail exterior of the bar K and having its free end passed below said bar to engage the groove or depression therein, substantially as herein described.

2. In a trace buckle, the inner clamping plate to connect with the hame tug, an outer clamping plate having a tongue to extend through the trace, a gripping bail to surround the trace and having its cross-bars exterior to the clamping plates, a central longitudinal bar in the outer or tongue plate having a notch or depression on the under surface, a connecting link adapted to pass beneath the central bar and engage the notch therein, and having the ends formed with lugs or hooks which loosely engage the gripping bail where it crosses above the plate, and a spring riveted within the plate and pressing against the link so as to retain it in engagement with the notch, substantially as herein described.

3. In a trace buckle, the combination of the inner and outer clamping plates, and the surrounding grip bail, said inner plate having the projecting points a and intermediate inclined surface H, and a rivet secured to the inclined surface and having its head provided with an extension, curved into hook form to clasp the grip bail where it crosses the inner clamping plate and thereby hold the bail to its place, substantially as herein described.

4. In a trace buckle, the outer clamping and tongue plate, provided with a central bar and the inner clamping plate to connect with the hame tug, a grip bail to extend exterior to the two clamp plates, connected with the bar of the outer plate by a link as shown, an inclined surface H upon the exterior of the inner plate, a device secured thereto and having a hook-shaped extension from the head thereof which clasps the central portion of the grip bail where it crosses the inner plate, substantially as herein described.

5. In a trace buckle the inner clamping plate the exterior clamping plate with an inwardly projecting tongue, a longitudinal bar having a notch or depression in the under side to engage connecting links, enlarged surfaces e with holes therein for the attachment of a wear leather, and outwardly projecting lugs or extensions d to form shoulders against which the grip bail bears, substantially as herein described.

6. In a trace buckle the inner clamping plate with its hook portion J, the outer clamping plate with its centrally grooved bar, a gripping bail surrounding the clamping plates and having one of its cross bars engaged by said hook portion, a link having hooks journaled upon the opposite cross bar of the bail and having its free end passed below the central grooved bar of the outer clamping plate whereby the bail is held in position and allowed to turn about its points of attachment, substantially as herein described.

In witness whereof I have hereunto set my hand.

OGDEN MALLORY.

Witnesses:
S. H. NOURSE,
J. A. BAYLESS.